United States Patent [19]

Kuch

[11] Patent Number: 4,489,048
[45] Date of Patent: Dec. 18, 1984

[54] PROCESS FOR PRODUCING HYDROGEN AND CARBONYL SULFIDE FROM HYDROGEN SULFIDE AND CARBON MONOXIDE USING A HETEROPOLYANIONIC METAL COMPLEX CATALYST

[75] Inventor: Philip L. Kuch, Aurora, Ohio

[73] Assignee: The Standard Oil Company (Ohio), Cleveland, Ohio

[21] Appl. No.: 448,545

[22] Filed: Dec. 10, 1982

[51] Int. Cl.$^3$ .......................... C01B 1/03; C01B 31/26
[52] U.S. Cl. ................................. 423/416; 423/648 R
[58] Field of Search ............... 423/415 R, 416, 548 R

[56] References Cited

U.S. PATENT DOCUMENTS 3,856,925  12/1974  Kodero et al. ...................... 423/416

Primary Examiner—Earl C. Thomas
Attorney, Agent, or Firm—Teresan W. Gilbert; John E. Miller, Jr.; Larry W. Evans

[57] ABSTRACT

Hydrogen and carbonyl sulfide are produced by a process comprising contracting gaseous hydrogen sulfide with gaseous carbon monoxide in the presence of a heteropolymolybdate or tungstate complex. Use of these catalysts reduce the amount of by-product carbon dioxide and methane formation and thus enhance the make of hydrogen and carbonyl sulfide.

20 Claims, No Drawings

PROCESS FOR PRODUCING HYDROGEN AND CARBONYL SULFIDE FROM HYDROGEN SULFIDE AND CARBON MONOXIDE USING A HETEROPOLYANIONIC METAL COMPLEX CATALYST

BACKGROUND OF THE INVENTION

1. Field of the Invention

This invention relates to the production of hydrogen. In one aspect, the invention relates to the production of hydrogen from the reaction of hydrogen sulfide and carbon monoxide while in another aspect, the invention relates to the use of heteropolyanionic metal complex catalysts to promote this reaction.

2. Description of the Prior Art

Hydrogen is a valuable resource as both a fuel source and chemical feedstock and as such, its production has received much attention from the chemical industry. Presently, the dominant industrial method of production is the reaction of steam with natural gas (steam reforming) although various other methods are known. Of these other methods, one that is of particular interest is the oxidation of hydrogen sulfide with carbon monoxide to produce hydrogen and carbonyl sulfide.

This reaction is of particular interest for several reasons, one of which is that hydrogen sulfide is a relatively inexpensive material and is available in large quantities from the desulfurization of fossil fuels and sour natural gas deposits. Presently this material is considered more of a waste problem than a feedstock and is typically oxidized by the Claus process to water and elemental sulfur.

Another reason for the interest in this reaction is that it can be combined with other reactions to form various thermochemical cycles, such as

| | | |
|---|---|---|
| $H_2S + CO \rightarrow H_2 + COS$ | (a) | |
| $COS + O_2 \rightarrow CO + SO_2$ | (b) | |
| $H_2S + O_2 \rightarrow H_2 + SO_2$ | (c) | |

The second step which enables the recycle of relatively expensive carbon monoxide makes this thermochemical cycle economically attractive. In effect, hydrogen sulfide is converted to hydrogen and sulfur dioxide, the latter being a useful resource in the manufacture of sulfuric acid.

While the reaction of hydrogen sulfide and carbon monoxide to produce hydrogen and carbonyl sulfide is known, few catalysts have been identified as useful for promoting it. Fukuda et al. describe in several publications the use of various metal sulfides, e.g. titanium disulfide, zinc sulfide, copper sulfide, nickel sulfide, etc. See U.S. Pat. No. 3,856,925; *Journal of Catalysis*, 49, 379 (1977); and *Bulletin of Chemistry for Japan*, 51, 150 (1978). However, since these disclosures describe relatively few catalysts, there is a continuing interest in identifying new catalysts for this reaction.

SUMMARY OF THE INVENTION

According to this invention, hydrogen and carbonyl sulfide are produced by a process comprising contacting gaseous hydrogen sulfide with gaseous carbon monoxide in the presence of a catalytic amount of a heteropolyanionic metal complex of the formula:

$$A_{1-10} [M_{6-18} M'_{1-3} V_{0-2} O_x S_y] \cdot nH_2O \quad (I)$$

where
- A is at least one cation of NH$_4$, Na, K, Li, H, Cs, Rb, Ca, Ba and Mg;
- M is at least one of Mo and W;
- M' is at least one of P, As, Bi, Ce, Cu, Ge, Sn, Ti, Si, Ni, Fe, Co, Al, Cr, Th, Zn and Te;
- n is a number of 0 to about 42; and
- the sum of x+y is a number that satisfies the valence requirements of the other elements present.

The use of these catalysts in this process reduces the amount of by-product carbon dioxide and methane production and thus enhances the production of hydrogen and carbonyl sulfide.

DETAILED DESCRIPTION OF THE INVENTION

Catalysts:

As is evident from formula I, the catalytic composition used in this invention is at least a 4 element material, i.e. a material containing a cationic component A, at least one of molybdenum and tungsten, at least one component M' and at least one of oxygen and sulfur, all in designated, proportional amounts. In addition, this material can be hydrated. Preferably, the subscript value of A in formula I is about 3 to about 10, of M about 6 to about 12, of M' about 1 to about 15, and of vanadium (V) about 0 to about 1.

Preferred catalysts are those where M is molybdenum, M' is at least one of phosphorus, arsenic, bismuth, copper and cobalt, and A is at least two species selected from ammonium, potassium, hydrogen, cesium and barium.

Those components of the catalyst enclosed within the brackets in formula I represent the components that form the anionic lattice or matrix of the composition while those components of formula I outside the brackets, i.e. A, represent the cationic components associated with but not a part of the anionic lattices. The water component, when present (70), is located in the various interstices of the compositional lattice, i.e. the lattice formed from the array or packing of the anionic lattices.

When vanadium is incorporated into these compositions, it is made part of the anionic lattice and thus replaces some of the molybdenum or tungsten. For example, when vanadium is incorporated into a catalyst of the formula:

$$K_3 [Mo_{12} P O_x] \cdot nH_2O \quad (II)$$

then the new formulation is represented by the formula:

$$K_3 [Mo_{11} P V O_x] \cdot nH_2O \quad (III)$$

Of course, if more vanadium would be incorporated into this composition, then the subscript value of vanadium would increase and the subscript value of molybdenum would decrease.

As is taught by formula I, certain of the components can be combinations of two or more elements, e.g. A can be a combination of potassium and ammonium. In such instances, the subscript value represents the sum of the elements (e.g. for A, the sum of the potassium and ammonium components is a number of about 1–10).

The value of n will be a function of the exact formulation of the catalytic composition and the operating temperature of the process. For many heteropolymolybdates and tungstates, significant quantities of constitutional water are lost with mild heating (100°–150° C.). The remaining constitutional waters can be removed under more severe conditions and this usually entails rearrangement of the compositional lattice. However, the composition resulting from the rearrangement remains heteropolyanionic in nature.

Similarly, the degree to which sulfur replaces oxygen in the lattice will be a function of the composition formulation and the conditions used to sulfide the composition. Generally it is preferable to prepare the catalyst as an oxide and subsequently sulfide it although catalysts can be prepared as a pure sulfide in which case x is zero.

The catalytic compositions of this invention can be used either in the 100 percent active form or in a diluted form and can be either supported or unsupported. Suitable support materials include silica, titania, alumina, silica-alumina, zirconia, silicon carbide, boron, various phosphates, etc. with the high surface area ( about 50 m$^2$/g) gamma-aluminas and silica aluminas preferred. If a support is used, the catalytic composition (Formula 1) is generally present in an amount of at least about 10 weight percent, based on the combined weight of the support and the catalytic composition, and preferably in an amount of at least about 30 weight percent.

The catalysts here used can be prepared in any one of a number of methods including conventional solution, slurry or impregnation techniques. Typically, the catalysts are prepared by mixing the appropriate catalyst components in the proper proportions in an aqueous mixture, removing the liquid media with or without a reducing agent, and calcining the solid product. The components can be added in any order during the preparation procedure but certain orders may be preferred to others depending upon the composition of the final catalyst. For example, those catalysts containing phosphorus are generally prepared by first mixing the metallic ingredients and then adding the phosphorus component (generally in the form of phosphoric acid). The components employed can be the oxides, halides, nitrates, acetates, carbonates, or other salts of the particular metals or elements added and particularly preferred is the use of water soluble salts of the metal components. If a support is used, the material comprising the support may be incorporated into the catalyst along with the other ingredients or the catalyst composition may be coated and/or impregnated onto or into the support. After the catalyst components have been combined to form an aqueous mixture, the mixture is taken to dryness, the dried solid obtained is heated in the presence of a non-oxidizing environment, such as nitrogen, at a temperature between about 350°–800° C. This calcination can take place outside the reactor or an in situ activation can be utilized. Other methods of preparation are broadly taught in the art and include such techniques as using non-aqueous or mixtures of aqueous and non-aqueous media, multiple impregnation and/or calcination steps, pH adjustment of the catalyst precursor slurry or solution, etc.

Preferably, if the catalyst is to be sulfided then it is sulfided subsequent to calcination. Typically, the catalyst is sulfided at a temperature between about 100° and 800° C., preferably between about 300° and about 500°0 C., at a pressure of between about 1 and 50 atmospheres, preferably about 1 and 10 atmospheres, for a period of less than 1 hour to more than 24 hours, preferably between about 1 and about 4 hours. Hydrogen sulfide is a preferred sulfiding agent although other sulfiding agents, such as the various mercaptans (e.g. methyl mercaptan, ethyl mercaptan, etc.), can be used. The sulfiding can be done either neat or in the presence of a diluent (for the sulfiding agent) and it can be done either before, after or concurrent with the optional reduction step employing hydrogen gas. If done concurrent with hydrogen, the hydrogen sulfide:hydrogen ratio typically varies between 50:1 and 1:50.

The catalysts of this invention can also be sulfided on-stream with the feed and/or product gas stream. This treatment will result in a catalyst containing both oxygen and sulfur in the lattice but the exact number of each is difficult to determine and probably changes over the course of the reaction until equilibrium is reached.

Reaction:

As stated earlier, the reaction of carbon monoxide with hydrogen sulfide to form carbonyl sulfide and hydrogen is a known vapor phase reaction and is described in such references as U.S. Pat. No. 3,856,925 and Fukuda et al., *Journal of Catalysis*, 49, 379 (1977). The reaction is typically conducted within a temperature range of 50°–800° C., preferably 200°–400° C., and within a pressure range of 0–500 psig, preferably 0–250 psig. Stoichiometric amounts of reactants are required although preferably an excess of hydrogen sulfide or carbon monoxide is present as a means of shifting the equilibrium to the right. The reaction can be conducted in any vapor phase reactor including the various fixed- and fluid-bed configurations and the contact time of the reactants over the catalyst bed will vary with the other process parameters. Typically a contact time of about 1 to about 20 seconds, preferably 2 to about 10 seconds is employed in a fixed-bed reactor.

The products of this process are hydrogen, carbonyl sulfide and minor amounts of other compounds, primarily methane and carbon dioxide. Hydrogen and carbonyl sulfide are the desired products, the former to be ultimately recovered and the latter a useful intermediate in various thermochemical cycles in which this reaction is but one step.

The following examples are illustrative embodiments of this invention. Unless indicated to the contrary, all parts and percentages are by mole.

SPECIFIC EMBODIMENTS

Catalyst Preparation:

The catalyst of Example 1 in the Table was prepared by the following procedure:

Phosphomolybdic acid H$_3$(Mo$_{12}$ P O$_{40}$).29H$_2$O (9 g) was dissolved in water (36 cc). This solution was used to treat a high surface area gamma-alumina (25 g, surface area of about 200 m$^2$/g, pellet form) obtained from Strem Chemicals. The mixture was stirred for about 30 minutes and the excess liquid was decanted. The pellets were then dried overnight at 125° C. and subsequently treated in a similar manner with a solution of potassium hydroxide (0.6 g in 36 cc of water). After stirring, the excess liquid was decanted and the catalyst was again dried overnight at 125° C.

Approximately 20 cc of the resulting catalyst precursor (gamma-alumina pellets impregnated with the various metal and non-metal components) was placed in a quartz tube (0.5" internal diameter, catalyst bed about 4" long and held in place with quartz wool plugs. The precursor was then treated for about 15 minutes at room temperature with nitrogen, then for about one hour at 400° C. with nitrogen, and finally for about one hour at 400° C. with hydrogen sulfide. The finished catalyst can be represented by the empirical formula:

$$K_3(Mo_{12} P O_x S_y) \cdot nH_2O \qquad (IV)$$

The catalyst composition (Formula IV) comprised about 20 weight percent of the combined weight of composition and support.

The other catalysts reported in the Table were prepared by a similar procedure but with the following modifications.

The catalyst of Example 2 was commercially obtained, 5 g was dissolved in about 25 cc of water, absorbed into about 50 g of gamma-alumina, and subsequently dried at 125° C.

The components of the catalysts of Examples 3-5 were incorporated into the gamma-alumina support by sequential impregnation steps with a drying step between each impregnation. The support of Example 3 was first contacted with a mixture of $H_2O$ (21 cc), $MoO_3$ (25 g), $KNO_3$ (4.38 g) and concentrated $NH_4OH$ (29 cc), followed by a mixture of $H_2O$ (50 cc) and $Bi(NO_3)_3 \cdot 5H_2O$ (7 g) followed by a mixture of $H_2O$ (50 cc) and $H_3PO_4$ (1.4 g).

The support of Example 4 was first contacted with a mixture of $H_2O$ (21 cc), $MoO_3$ (25 g), $KNO_3$ (2 g), $Cu(NO_3)_2 \cdot 3H_2O$ (1.1 g) and concentrated $NH_4OH$ (29 cc), and then with a mixture of $H_2O$ (50 cc), $KNO_3$ (4 g), $Cu(NO_3)_2 \cdot 3H_2O$ (0.5 g) and $H_3AsO_4$ (2.18 g).

The support of Example 5 was first contacted with a mixture of $H_2O$ (50 cc) and $(NH_4)_6 Mo_7O_{24} \cdot 4H_2O$ (30.5 g), and then with a mixture of $H_2O$ (50 cc), $KNO_3$ (4.38 g) and $Ce(NO_3)_3 \cdot 6H_2O$ (6.27 g).

Procedure and Conditions:

Unless otherwise noted, the reactions were conducted in the quartz tube used to condition and sulfide the catalyst precursor as described in the preceding paragraph. Following this pretreatment, a feed of hydrogen sulfide:carbon monoxide was introduced into the tube at a 1:1 molar ratio and at a flow rate that established a 10 second contact time of reactants over the catalyst bed. The off-gas rate was measured with a soap-film meter and the off-gas composition was determined after one hour of on-stream activity with the aid of a Carle 111 gas chromatograph equipped with a 158-b column system. Reject gases were scrubbed in a monoethanolamine/water solution and then vented to the hood. The reaction temperature of each example was approximately 40° C. and the tube was heated by means of a Lindberg tube furnace. The reactant gases were introduced into the tube from tanks through stainless steel tubing, regulators, flow controllers, and rotometers. The gases were purchased from the Matheson Gas Company and used without further purification.

The percent conversion as reported in the Table was calculated by subtracting the amount of hydrogen sulfide leaving the reactor from the amount of hydrogen sulfide fed to the reactor and dividing the difference by the amount of hydrogen sulfide fed to the reactor and then multiplying the quotient by 100. The ratios of hydrogen to methane and hydrogen to carbon dioxide were calculated by simply dividing the hydrogen recovered (in mole percent) by either the methane or carbon dioxide recovered (also in mole percent) and reporting the quotient. The higher the quotient, the better the selectivity. Although not reported in the Table, for each mole of hydrogen produced, one mole of carbonyl sulfide was also produced.

TABLE

REACTION OF HYDROGEN SULFIDE AND CARBON MONOXIDE IN THE PRESENCE OF VARIOUS HETEROPOLYMOLYBDATE ACID COMPLEXES

| Example | Catalyst* | $H_2S$ Conversion (%) | $H_2/CH_4$ | $H_2/CO_2$ |
|---|---|---|---|---|
| 1 | $K_3[Mo_{12}POxS_y] \cdot nH_2O$ | 21.6 | 1.28 | 0.78 |
| 2# | $H_6(NH_4)_3[Mo_6CoO_xS_y] \cdot nH_2O$ | 20.9 | ∞ | 1.52 |
| 3 | $K_3[Mo_{12}PBi_{.5}O_xS_y] \cdot nH_2O$ | 23.4 | 1.58 | 0.98 |
| 4 | $K_3[Mo_{12}AsCu_{.5}O_xS_y] \cdot nH_2O$ | 17.2 | 2.51 | 1.55 |
| 5 | $H_2K_3(NH_4)_3[Mo_{12}CeO_xS_y] \cdot nH_2O$ | 29.3 | 0.98 | 0.45 |

*Catalyst composition comprised about 7 and 17-18 weight percent of the combined weight of composition and support in Examples 2 and 3-5, respectively.
Reaction temperature 250° C.

The above data demonstrates that the use of catalysts of formula I promote the manufacture of hydrogen from $H_2S$ and CO at near the equilibrium limit for this reaction. In addition, Example 2 demonstrates a superb selectivity for $H_2$ over $CH_4$ at a relatively low reaction temperature.

Although this invention is described by the above examples, these examples are for the purpose of illustration only. Various modifications can be made by one skilled in the art without departing from the spirit and scope of the invention.

What is claimed is:

1. A process for the production of hydrogen and carbonyl sulfide, the process comprising contacting gaseous hydrogen sulfide with gaseous carbon monoxide in the presence of a catalytic amount of a heteropolyanionic metal complex of the formula:

$$A_{1-10}[M_{6-18} M'_{1-3} V_{0-2} O_x S_y] \cdot nH_2O \qquad (I)$$

where
A is at least one cation of $NH_4$, Na, K, Li, H, Cs, Rb, Ca, Ba and Mg;
M is at least one of Mo and W;
M' is at least one of P, As, Bi, Ce, Cu, Ge, Sn, Ti, Si, Ni, Fe, Co, Al, Cr, Th, Zn and Te;
n is a number of 0 to about 42; and
the sum of x+y is a number that satisfies the valence requirements of the other elements present.

2. The process of claim 1 where M is molybdenum.

3. The process of claim 1 where M' is at least one of phosphorus, arsenic, bismuth, copper and cobalt.

4. The process of claim 2 where M' is at least one of phosphorus, arsenic, bismuth, copper and cobalt.

5. The process of claim 1 where A is at least one cation of ammonium, potassium, hydrogen, cesium and barium.

6. The process of claim 2 where A is at least one cation of ammonium, potassium, hydrogen, cesium and barium.

7. The process of claim 3 where A is at least one cation of ammonium, potassium, hydrogen, cesium and barium.

8. The process of claim 4 where A is at least one cation of ammonium, potassium, hydrogen, cesium and barium.

9. The process of claim 1 where the subscript of vanadium is greater than zero.

10. The process of claim 1 where the subscript of vanadium is zero.

11. The process of claim 8 where the subscript of vanadium is zero.

12. The process of claim 1 where the subscript of A is about 3–10, of M is about 6–12 and of M' about 1–1.5.

13. The process of claim 2 where the subscript of A is about 3–10, of M is about 6–12 and of M' about 1–1.5.

14. The process of claim 5 where the subscript of A is about 3–10, of M is about 6–12 and of M' about 1–1.5.

15. The process of claim 8 where the subscript of A is about 3–10, of M is about 6–12 and of M' about 1–1.5.

16. The process of claim 10 where the subscript of A is about 3–10, of M is about 6–12 and of M' about 1–1.5.

17. The process of claim 1 where the heteropolyanionic metal complex is used in combination with a support.

18. The process of claim 5 where the heteropolyanionic metal complex is used in combination with a support.

19. The process of claim 8 where the heteropolyanionic metal complex is used in combination with a support.

20. The praocess of claim 17 where ther heteropolyanionic metal complex is present in an amount of at least about 10 weight percent, based upon the combined weight of the support and complex.

* * * * *